US009104398B2

(12) United States Patent
Karimisetty et al.

(10) Patent No.: US 9,104,398 B2
(45) Date of Patent: Aug. 11, 2015

(54) INVOCATION OF EXTERNAL WEB SERVICES USING DYNAMICALLY GENERATED COMPOSITE APPLICATIONS

(71) Applicant: Oracle International Corporation, Redwood Shores, CA (US)

(72) Inventors: Srikanth Karimisetty, Austin, TX (US); Bankush Gulati, San Ramon, CA (US); Chandrashekar Reddy Tiruvidula, Austin, TX (US); Kannan Tarakad, Belmont, CA (US); Stephanie Merenda, San Jose, CA (US); Ranvijay Singh, Hyderabad (IN); Aravind Kadiyala Venkata, Hyderabad (IN); Shivatrilok Bommidala Kumar, Visakhapatnam (IN)

(73) Assignee: Oracle International Corporation, Redwood Shores, CA (US)

( * ) Notice: Subject to any disclaimer, the term of this patent is extended or adjusted under 35 U.S.C. 154(b) by 161 days.

(21) Appl. No.: 13/798,962

(22) Filed: Mar. 13, 2013

(65) Prior Publication Data

US 2014/0282394 A1    Sep. 18, 2014

(51) Int. Cl.
G06F 9/44     (2006.01)
G06F 9/445    (2006.01)

(52) U.S. Cl.
CPC .... G06F 8/30 (2013.01); G06F 8/60 (2013.01)

(58) Field of Classification Search
None
See application file for complete search history.

(56) References Cited

U.S. PATENT DOCUMENTS

| 6,601,233 | B1 | 7/2003 | Underwood | |
|---|---|---|---|---|
| 7,665,064 | B2 * | 2/2010 | Able et al. | 717/117 |
| 2006/0048097 | A1 * | 3/2006 | Doshi | 717/120 |

OTHER PUBLICATIONS

Michael Kassoff et al., "Creating GUIs for Web Services", IEEE Computer Society, Sep.-Oct. 2003.
David Martin et al., "OWL-S: Semantic Markup for Web Services", W3C Member Submission, Nov. 22, 2004, http://www.w3.org/Submission/OWL-S/.
Wikipedia, the free encyclopedia, "The OWL-S Ontology", Mar. 4, 2013, http://en.wikipedia.org/wiki/Owl-s.

* cited by examiner

*Primary Examiner* — Chuck Kendall
(74) *Attorney, Agent, or Firm* — Miles & Stockbridge P.C.

(57) ABSTRACT

A system is provided that invokes an external web service using a composite application. The system creates a composite application definition, where the composite application definition includes external web service information and a mapping of a task operation to a service operation. The system further dynamically generates the composite application based on the composite application definition, where the composite application includes computer code. The system further deploys the composite application.

18 Claims, 6 Drawing Sheets

US 9,104,398 B2

INVOCATION OF EXTERNAL WEB SERVICES USING DYNAMICALLY GENERATED COMPOSITE APPLICATIONS

FIELD

One embodiment is directed to a computer system, and more particularly, to a computer system that invokes web services.

BACKGROUND

In software engineering, a service-oriented architecture ("SOA") is a set of principles and methodologies for designing and developing software in a form of interoperable services, such as web services. Such interoperable services can have well-defined business functionalities that can be built as software components (i.e., discrete pieces of computer code and/or data structures) which can be reused for different purposes. SOA systems can provide a way for consumers of services, such as web-based software applications, to be aware of available of SOA-based services.

In SOA systems, there can be various instances which require a web service to be invoked. For every such requirement, specialized computer code may be required to call an external service, map the operations of the service and implement all the necessary message mappings. In addition, if there is a business requirement to invoke different services based on business criteria, specialized computer code may also be required to implement logic to invoke the appropriate service based on the business criteria. For example, if an SOA system invokes a web service to create a Federal Express® shipment request in one business scenario, but invokes a separate web service to create a UPS® shipment request in another business scenario, specialized computer code can be required to determine which web service to invoke.

SUMMARY

One embodiment is directed to a system that invokes an external web service using a composite application. The system creates a composite application definition, where the composite application definition includes external web service information and a mapping of a task operation to a service operation of the external web service. The system further dynamically generates the composite application based on the composite application definition, where the composite application includes computer code. The system further deploys the composite application.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

In one embodiment, a system is provided that can dynamically generate a composite application, where the composite application can act as a service connector, and can allow the system to transmit a task request to an external web service of an external system, and to receive a task response from the external web service of the external system. The system allows a user to create a composite application definition that declaratively defines an external web service, and that maps one or more task operations to one or more service operations of the external web service. The system can then dynamically generate the composite application based on the composite application definition and deploy the composite application. The system can further provide a rule framework for the user to define one or more business rules (also identified as "service rules") which, when applied, will dynamically select an external web service to be invoked. The system can then further use the dynamically generated composite application to invoke the external service. By using the composite application to invoke the external service, the system can transmit request messages to the external system, and receive response messages from the external system. Thus, by using the composite application, the system can provide for dynamic message transformation and service invocation.

Figure 1:
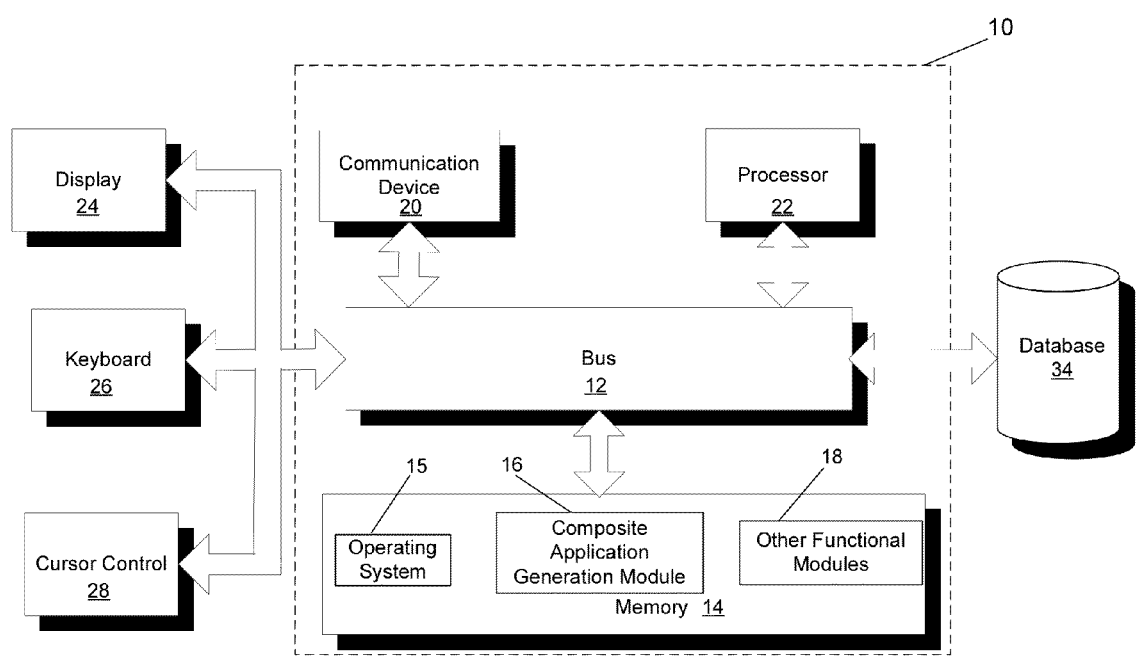
FIG. 1 illustrates a block diagram of a composite application generation system that can implement an embodiment of the invention.

FIG. 1 illustrates a block diagram of a composite application generation system 10 that can implement one embodiment of the invention. Composite application generation system 10 includes a bus 12 or other communications mechanism for communicating information between components of composite application generation system 10. Composite application generation system 10 also includes a processor 22, operatively coupled to bus 12, for processing information and executing instructions or operations. Processor 22 may be any type of general or specific purpose processor. Composite application generation system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Composite application generation system 10 further includes a communication device 20, such as a network interface card or other communications interface, to provide access to a network. As a result, a user may interface with composite application generation system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with composite application generation system 10.

According to one embodiment, memory 14 can store software modules that may provide functionality when executed by processor 22. The modules can include an operating system 15, a composite application generation module 16, as well as other functional modules 18. Operating system 15 can provide an operating system functionality for composite application generation system 10. Composite application generation module 16 can provide functionality for dynamically generating a composite application and invoking an external web service using the dynamically generated composite application, as will be described in more detail below. In certain embodiments, composite application generation module 16 can comprise a plurality of modules, where each module provides specific individual functionality for dynamically generating a composite application and invoking an external web service using the dynamically generated composite application. Composite application generation system 10 can also be part of a larger system. Thus, composite application generation system 10 can include one or more additional functional modules 18 to include the additional functionality. For example, functional modules 18 may include modules that provide additional functionality, such as the "Oracle Supply Chain Orchestration" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, in an SOA environment, a system, such as an orchestration system, may need to connect to different external systems, such as enterprise resource planning ("ERP") systems, in order to fulfill task requests, such as supply chain order requests. For example, a system may receive a task request that requires the execution of an external web service of an external system in order to complete the task. As a more detailed example, the system may receive a task request that causes the system to perform one or more logical operations (such as create a new purchase order, cancel a pre-existing purchase order, or update a pre-existing purchase order). In this scenario, in order to perform the one or more logical operations, the system may need to send the task request to the external system and receive a task response from the external system, once the external system has completed the task. However, the external system may not understand a format utilized by the one or more logical operations, and thus, may not understand a format of messages that can be generated by the one or more logical operations. For example, a logical operation identified as "Create Purchase Order" in the system may be identified as "Add Purchase Order" in the external system. Thus, there may be a need for a mapping between the logical operation of the system, and a service operation of the external web system. Further, the system may require specialized computer code, such as a composite application that can act as a service connector, where the specialized computer code can translate a message from a format utilized by the system into a format utilized by the external system and vice-versa, based on this mapping of the logical operation to the service operation.

According to an embodiment, such specialized computer code can be dynamically generated based on information that a user provides regarding an external web service of the external system, where the information includes a mapping of a logical operation of a system to a service operation of an external system, as is described below in greater detail.

Figure 2:
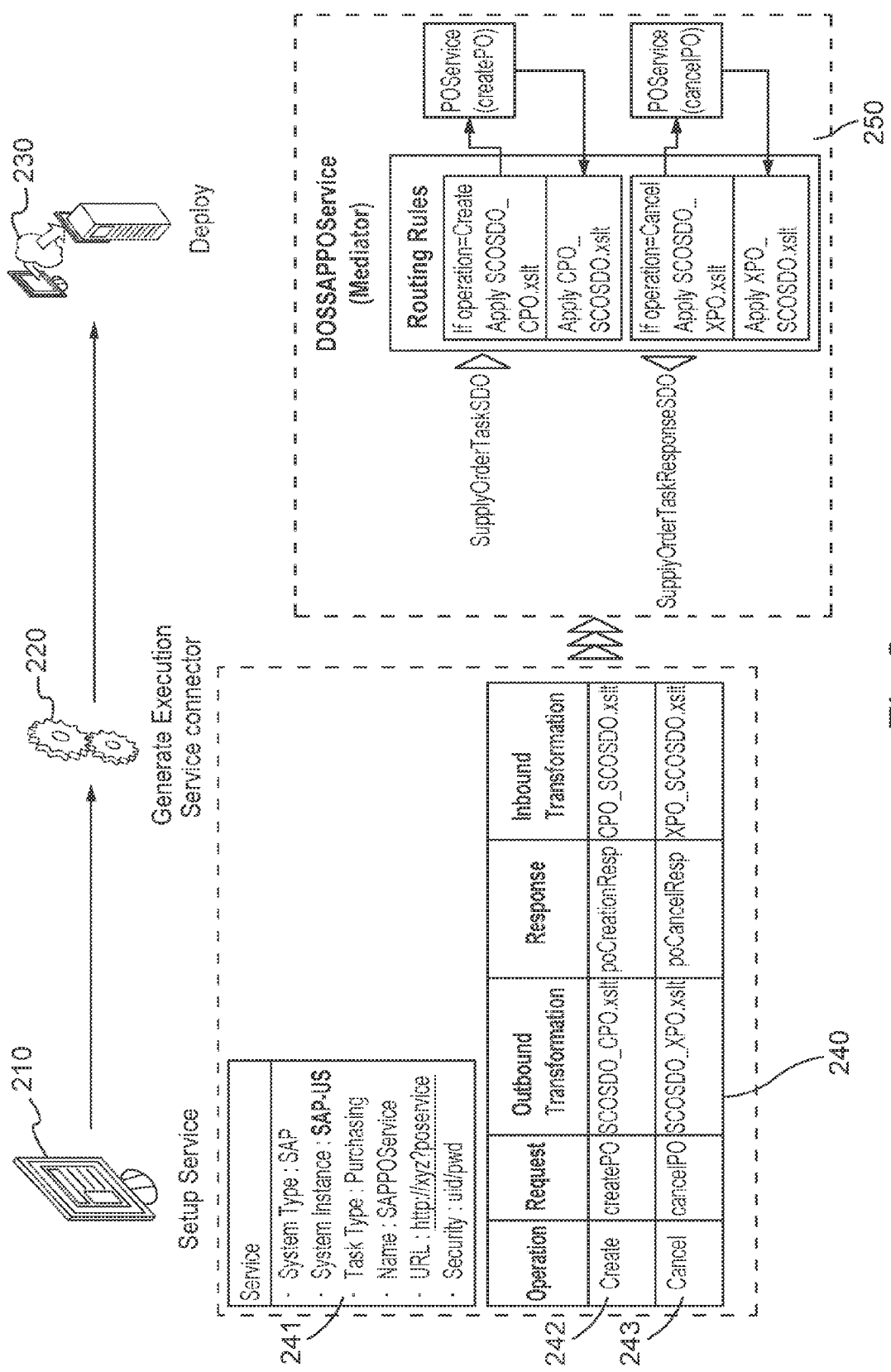
FIG. 2 illustrates a dynamic generation and deployment of a composite application, according to an embodiment of the invention.

FIG. 2 illustrates a dynamic generation and deployment of a composite application, according to an embodiment of the invention. As previously described, a system can send requests to an external web service of an external system, and can also receive responses from the external web service of the external system. According to an embodiment, in order to facilitate this communication, a composite application can be utilized, where a composite application can act as a service connector. More specifically, the composite application can receive a request message from the system, transform the request message into a format that the external web service understands (i.e., an external format of the external web service), and send the transformed request message to the external web service. Further, the composite application can receive a response message from the external web service, transform the response message into a format that the system understands (i.e., an internal format), and send the transformed response message to the system.

In order to generate this composite application, at 210, a user of a system creates a composite application definition (such as composite application definition 240 of FIG. 2) at a user interface of the system, and thus, sets up an external web service for the system. Further, a user can create one or more composite application definitions at the user interface. An example user interface for creating a composite application definition for an external web service is further described below in greater detail with respect to FIG. 4.

As part of the composite application definition (e.g., composite application definition 240 of FIG. 2), a user can enter information in one or more fields of the user interface. The user can then cause the system to save the entered information and create the composite application definition using the entered information. In one embodiment, the information that is entered by the user can include the following information: external web service information (such as external web service information 241 of FIG. 2), and one or more mappings (such as mappings 242 and 243 of FIG. 2).

According to the embodiment, external web service information is information regarding the external web service that allows a composite application to connect to the external web service. External web service information can include a service name, which is an identifier of an external web service hosted by an external system. External web service information can further include a system type, which is a type of external system that hosts the external web service. External web service information can also include a system instance (also identified as a system identity), which is an identifier of the external system that hosts the external web service. External web service information can further include a task type, which is a type of task operation. One or more task operations can be associated with a specific task type.

External web service information can also include a service definition, where a service definition describes an external web service of an external system. In one embodiment, the service definition can be described using a web service definition language. Further, in one embodiment, the service definition can be described using a Uniform Resource Locator ("URL"), where the URL describes the location of the service definition that is hosted by the external system. As is described below in greater detail, the service definition can define one or more service operations of the external web service. Further, the service definition can define a type of message that is used by the external web service. In one embodiment, the creation of a composite application definition that includes a service definition, can also involve the registration of the service definition with the system. External web service information can also include a service description, which is a description of the external web service.

External web service information can also include one or more security credentials that allow the system to access the external system. Such security credentials can include a keystore alias and a user credential key. A keystore alias is an alias that identifies a repository of security credentials, such as authorization certificates or public key certificates, where the security credentials are required to access the external web service hosted by the external system. A user credential key is a key (such as a combination of a username and a password) that is required to access the external web service hosted by the external system.

External web service information can also include a maximum payload size. A maximum payload size identifies a maximum number of lines of data that an external web service can receive. This can be defined for external web services that have maximum limits for received data. According to an embodiment, if a request message that is sent to an external web service exceeds a maximum payload size for the external web service, the request can be split into a plurality of request segments, where each segment is a size of the maximum payload size or smaller. Examples of a maximum payload size can include 200, 1000, 2000, or any number.

Thus, in the illustrated embodiment of FIG. 2, external web service information 241 includes a system type with a value of "SAP." External web service information 241 further includes a system instance with a value of "SAP-US." External web service information 241 also includes a task type with a value of "Purchasing." External web service information 241 further includes a service name with a value of "SAP-POService." External web service information 241 also includes a service definition with a value of "http://xyz?poservice." External web service information 241 further includes a user credential key with a value of "uid/pwd." However, this is merely an example embodiment, and in other embodiments, external web service information 241 can include any information regarding the external web service that allows a composite application to connect to the external web service.

Further, according to the embodiment, a mapping is a mapping of a task operation of a system to a service operation of an external web service of an external system. A task operation is a logical operation defined by the system that the system can perform (such as "Create" or "Update"). A task operation can be associated with a task type. A service operation is a logical operation that the external web service can perform. A list of one or more service operations can be dynamically generated by parsing a service definition that is associated with the external web service. Each task operation of a system can be mapped to a service operation of the external web service by selecting the service operation from the list of one or more service operations that can be dynamically generated based on the service definition. As is discussed below in greater detail, each mapping can be used to transform messages from a format that the task operation understands (i.e., an internal format) to a format that the service operation understands (i.e., an external format of the external web service), and vice-versa. According to the embodiment, a service definition can include one or more mappings.

In one embodiment, a task operation can be mapped to both an outbound service operation of an external web service and an inbound service operation of an external web service. An outbound service operation is a service operation that receives a request message, and, in response to the request message, performs specified functionality. An inbound service operation is a service operation that performs specified functionality that generates a response message, and subsequently transmits the response message to the system. According to an embodiment, a mapping can further define an outbound transformation file and an inbound transformation file. An outbound transformation file is a file that can transform a request message that is generated by the system from a format that the system understands (i.e., an internal format) to a format that the external system understands (i.e., an external format of the external web service). An inbound transformation file is a file that can transform a response message that is generated by the external web service of the external system from a format that the external system understands (i.e., an external format of the external web service) to a format that the system understands (i.e., an internal format). In one embodiment, an outbound transformation file and/or an inbound transformation file can be a file in an Extensible Stylesheet Language ("XSL") language, where the XSL language can be used to transform a message from a first format to a second format.

Thus, in the illustrated embodiment of FIG. 2, mapping 242 is a mapping of a task operation of the system (identified in FIG. 2 as "Create") to an outbound service operation of the external web service (identified in FIG. 2 as "createPO") and to an inbound service operation of the external web service (identified in FIG. 2 as "poCreateResp"). According to the illustrated embodiment, the outbound service operation is associated with an outbound transformation file, "SCOSDO_CPO.xslt," and the inbound service operation is associated with an inbound transformation file, "CPO_SCOSDO.xslt." Further, in the illustrated embodiment of FIG. 2, mapping 243 is a mapping of a task operation of the system (identified in FIG. 2 as "Cancel") to an outbound service operation of the external web service (identified in FIG. 2 as "cancelPO") and to an inbound service operation of the external web service (identified in FIG. 2 as "poCancelResp"). According to the illustrated embodiment, the outbound service operation is associated with an outbound transformation file, "SCOSDO_XPO.xslt," and the inbound service operation is associated with an inbound transformation file, "XPO_SCOSDO.xslt."

According to the embodiment, at 220, a composite application (such as composite application definition 250 of FIG. 2) is dynamically generated based on the composite application definition created at 210, where the composite application can act as a service connector between a system and an external system. As one of ordinary skill in the art would readily appreciate, a composite application is a software application that includes computer code, and that can combine multiple existing functions, such as services, service components, and references, into the software application. As one of ordinary skill in the art would also readily appreciate, a composite application can include a mediator component, where the mediator component is a component that can route data, such as messages, from service providers to external systems, and vice-versa. Thus, a composite application can act as a service connector between an internal service of the system and an external web service of an external system.

According to the embodiment, the composite application can be dynamically generated based on the composite application definition defined at 210. Thus, a user is not required to manually develop the computer code of the composite application. Instead, the computer code is automatically generated based on the information contained within the composite application definition. Therefore, the user who created the composite application definition is not required to possess any software development or technical skills. In one embodiment, the composite application is dynamically generated by using one or more composite templates, such as SOA mediator composite templates, where each composite template is applied to the information contained within the composite application definition, in order to dynamically generate the computer code for the composite application.

Thus, in the illustrated embodiment of FIG. 2, composite application 250, which is an example of composite application that can be dynamically generated, is capable of receiving a request message from a system. As an example, the request message can be a service data object (identified in FIG. 2 as service data object "SupplyOrderTaskSDO"). Composite application 250 is further capable of determining whether the request message is associated with a task operation "Create," or a task operation "Cancel." In certain embodiments, composite application 250 makes this determination by applying one or more routing rules (identified in FIG. 2 as "routing rules"), where the routing rules are defined based on the possible task operations, and where each routing rule invokes a corresponding service operation based on business logic of the routing rule.

If the request message is associated with a task operation "Create," composite application 250 can apply an outbound transformation file (identified in FIG. 2 as "SCOSDO_CPO.xslt,") to transform the request message into an external web service format. Composite application 250 can then send the transformed request message to an external web service (identified in FIG. 2 as "POService") and apply a service operation (identified in FIG. 2 as "createPO") to the transformed request message). Composite application 250 can then receive a response message from the external web service, and apply an inbound transformation file (identified in FIG. 2 as "CPO_SCOSDO.xslt" to transform the response message into an internal format. As an example, the transformed response message can be a service data object (identified in FIG. 2 as service data object "SupplyOrderTaskResponseSDO").

However, if the request message is associated with a task operation "Cancel," composite application 250 can apply an outbound transformation file (identified in FIG. 2 as "SCOSDO_XPO.xslt,") to transform the request message into an external web service format. Composite application 250 can then send the transformed request message to an external web service (identified in FIG. 2 as "POService") and apply a service operation (identified if FIG. 2 as "cancelPO") to the transformed request message). Composite application 250 can then receive a response message from the external web service, and apply an inbound transformation file (identified in FIG. 2 as "XPO_SCOSDO.xslt") to transform the response message into an internal format. As an example, the transformed response message can be a service data object (identified in FIG. 2 as service data object "SupplyOrderTaskResponseSDO").

According to the embodiment, at 230, the composite application that is dynamically generated at 220 is deployed. By being deployed, a run-time instance of the composite application is implemented in a production environment, where the run-time instance of the composite application can be used by the system to invoke one or more external web services of an external system. According to the embodiment, a production environment refers to an environment where a system can connect to an external system, and can receive a task request and invoke one or more external web services of an external system to execute the task request. The run-time execution of a deployed composite application is further described below in greater detail with respect to FIG. 3. Further, in an alternate embodiment, rather than deploying the composite application in a production environment, the composite application can first be downloaded to a non-production environment. According to the embodiment, a non-production environment refers to an environment where a system is not connected to an external system, such as a testing environment. This can be done in order to test the composite application before deploying the composite application to a production environment.

Figure 3:
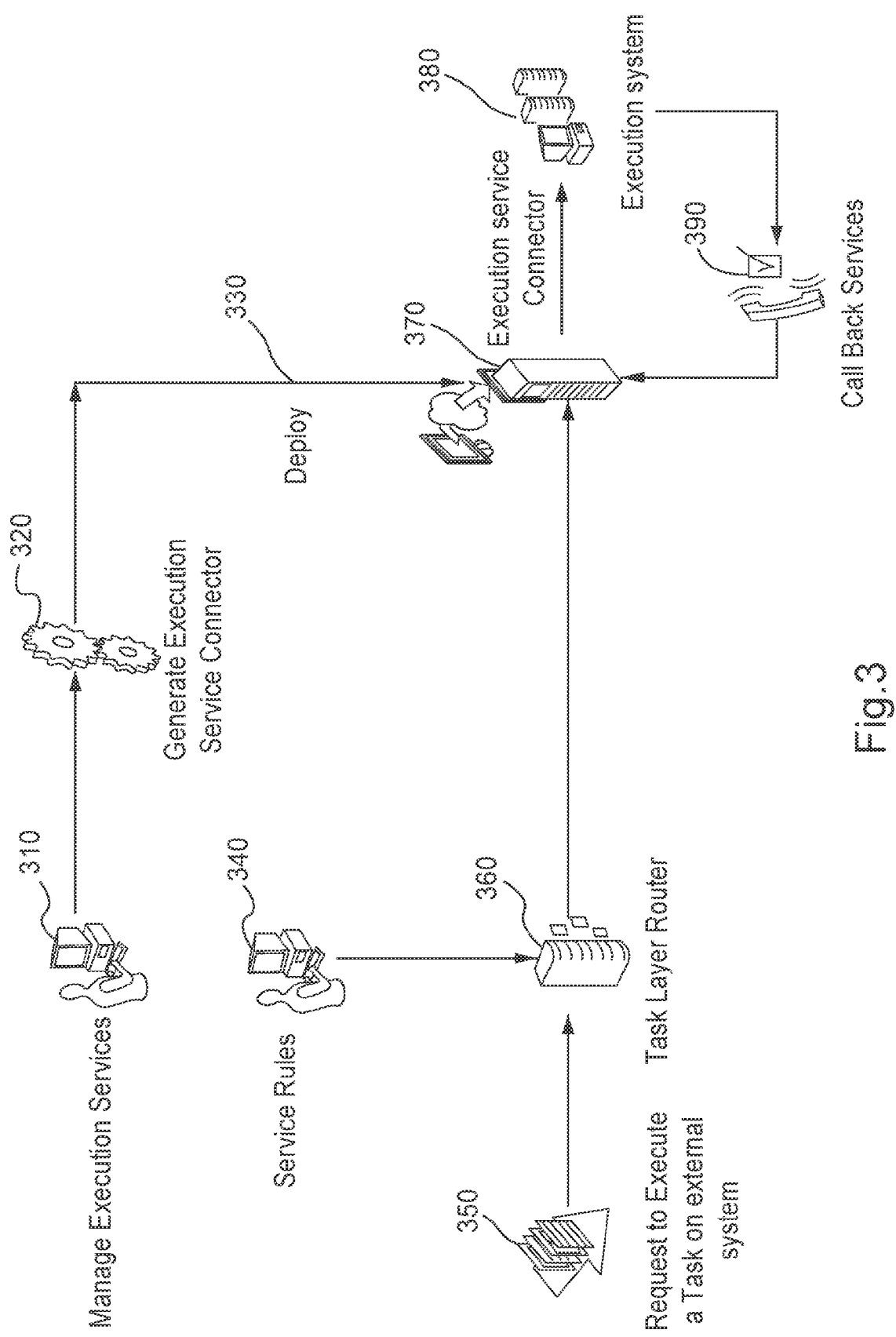
FIG. 3 illustrates an invocation of an external web service using a dynamically generated composite application, according to an embodiment of the invention.

FIG. 3 illustrates an invocation of an external web service using a dynamically generated composite application, according to an embodiment of the invention. At 310, one or more composite application definitions are created. The creation of a composite application definition at 310 is identical to the creation of a composite application definition at 210 of FIG. 2. At 320, one or more composite applications are dynamically generated based on a corresponding composite application definition, where each composite application can act as a service connector. The dynamic generation of a composite application at 320 is identical to the dynamic generation of a composite application at 220 of FIG. 2. At 330, one or more dynamically generated composite applications are deployed in a production environment. The deployment of a dynamically generated composite application at 330 is identical to the deployment of a dynamically generated composite application at 230 of FIG. 2.

At 340, a user of a system creates a business rule (also identified as a "service rule") at a user interface of the system, where the business rule can be used to select an external web service to be invoked, where a corresponding composite application can invoke the external web service. Further, a user can create one or more business rules at the user interface. An example user interface for creating a business rule that is used to select an external web service is further described below in greater detail with respect to FIG. 5.

A business rule is now described in greater detail. A "business rule" is a rule that controls operation of a composite application based on business logic and run-time data. Thus, when a business rule is created, business logic can also be created, where the business logic selects an external web service from a plurality of external web services. A run-time instance of a business rule can be applied to a task request that is received by a system, and the application of the business rule can determine, at least in part, which external web service is to be invoked, and thus, which composite application is to be executed, so the corresponding external web service is invoked.

For example, in a supply chain context, a system can receive requests to fulfill supply orders. Based on information specific to the supply order, determined at run-time, the system can select an external system from one or more external systems to fulfill the supply order. By selecting an external system, the system also selects an external web service to fulfill the supply order, and thus, selects a dynamically generated composite application to invoke the external web service. As a more specific example, if a request to fulfill a supply order is received by vendor X, a first external system can be selected to fulfill the supply order. However, if a request to fulfill a supply order is received by vendor Y, a second external system can be selected to fulfill the order. Such business logic can be stored in a business rule, and the system can apply the business rule the task request at run-time to select the external system (and thus, select the external web service and corresponding composite application to invoke the external web service). As another example, if a request to create a shipment is to be sent to Federal Express®, a first external system can be selected to send the shipment request to Federal Express®. However, if a request to create a shipment is to be sent to UPS®, a second external system can be selected to send the shipment request to UPS®. Similarly, such business logic can be stored in a business rule, and the system can apply the business rule the task request at run-time to select the external system (and corresponding composite application and external web service).

According to the embodiment, at 350, the system receives a task request. As previously described, a task request is a request to execute a task. A task can include one or more task operations. Thus, the request to execute a task can include one or more requests to execute a task operation. In the embodiment, a request to execute a task includes a request for an external system to execute one or more task operations, where an external web service hosted by the external system can execute the task operation.

At 360, the system applies one or more business rules created at 340 to the task request. By applying the one or more business rules, the system selects an external system to execute one or more task operations of the task request. By selecting an external system, the system selects an external web service to execute one or more task operations of the task request. Further, by selecting an external web service, the system selects a dynamically generated composite application to execute in order to invoke the selected external web service.

At 370, the selected composite application is executed. The execution of the selected composite application invokes the selected external web service hosted on the selected external system. The execution of the selected composite application further includes transforming a request message generated by the system from an internal format to an external format of the external web service based on a mapping of the composite application definition. The mapping can be a mapping of a task operation to an outbound service operation. The transformation of the request message can be based on an outbound transformation file.

At 380, the transformed request message is sent to the invoked external web service hosted on the selected external system. An outbound service operation of the invoked external web service performs specified functionality based on the transformed request message. Further, an inbound service operation of the invoked external web service performs specified functionality and generates a response message.

At 390, the response message is received from the invoked external web service. The composite application that invoked the external web service further transforms the response message from an external format of the external web service to an internal format based on a mapping of the composite application definition. The mapping can be a mapping of an inbound service operation to a task operation. The transformation of the response message can be based on an inbound transformation file. The system can then perform specified functionality based on the transformed response message.

Figure 4:
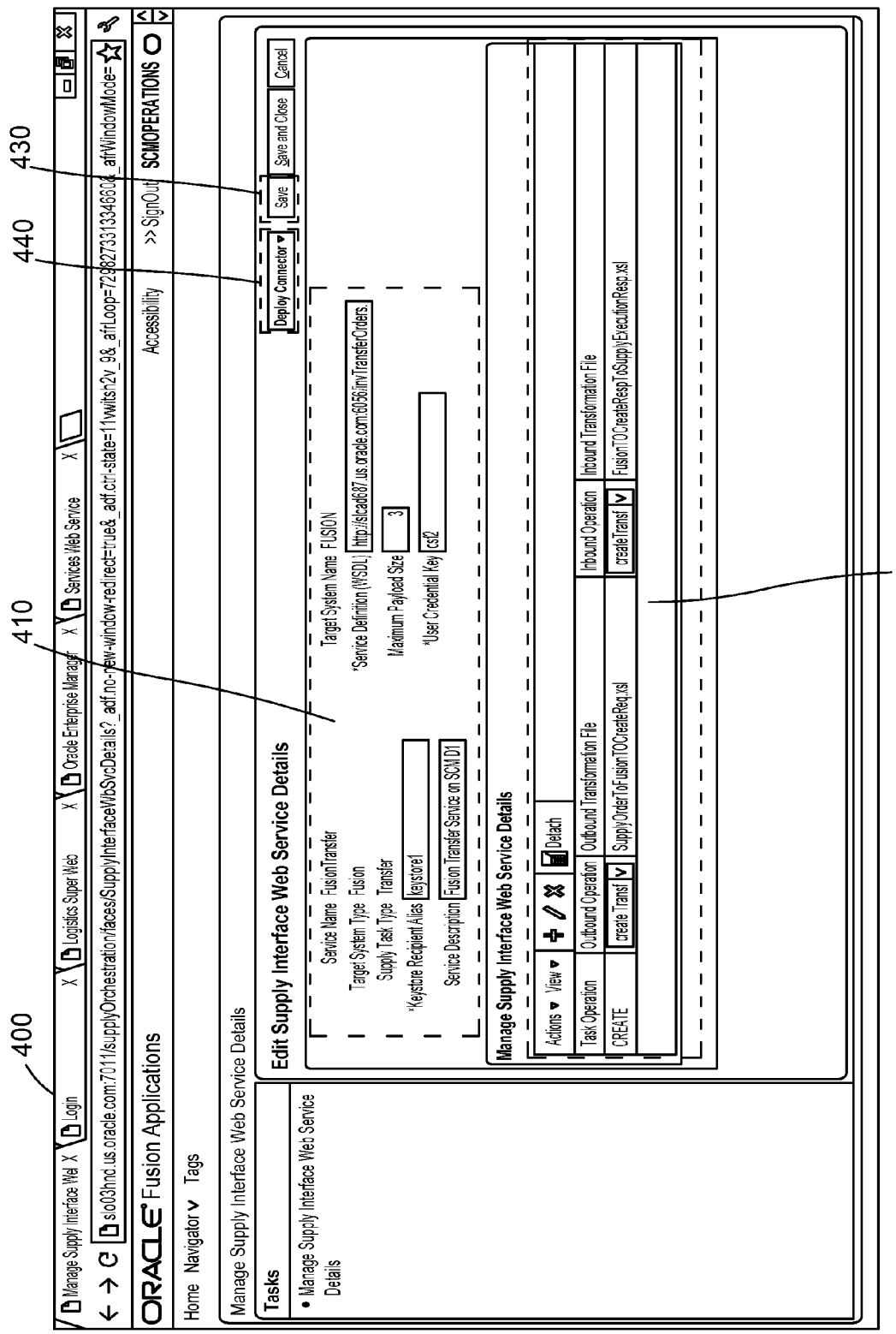
FIG. 4 illustrates an example user interface for creating a composite application definition for an external web service, according to an embodiment of the invention.

FIG. 4 illustrates an example user interface 400 for creating a composite application definition for an external web service, according to an embodiment of the invention. User interface 400 displays one or more fields, where a user can enter information within the one or more fields, and the entered information can be used to create the composite application definition for the external web service. According to the illustrated embodiment, user interface 400 displays external web service information component 410, where external web service information component 410 includes a plurality of fields for entering external web service information. More specifically, in the illustrated embodiment of FIG. 4, external web service information component 410 includes a service name field, where a user can enter an identifier of an external web service hosted by an external system. External web service information component 410 further includes a target system name field, where a user can enter an identifier of the external system that hosts the external web service. External web service information component 410 further includes a target system type field, where a user can enter a system type, or type of external system that hosts the external web service. External web service information component 410 further includes a service definition field, where a user can enter a service definition that describes the external web service of the external system. In certain embodiments, the user can enter a URL that describes the location of the service definition that is hosted by the external system.

In the illustrated embodiment, external web service information component 410 further includes a task type (or supply task type) field, where the user can enter a type of task operation. External web service information component 410 further includes a maximum payload size field, where a user can enter a maximum payload size. External web service information component 410 further includes a keystore recipient alias field, where a user can enter a keystore alias. External web service information component 410 further includes a user credential key field, where a user can enter a user credential key. External web service information component 410 further includes a service description, where the user can enter a description of the external web service.

According to the illustrated embodiment, user interface 400 also displays mappings component 420, where mappings component 420 includes a plurality of fields for entering one or more mappings. Mapping component 420 allows a user to add, edit, or delete one or more mappings, where a mapping is a mapping of a task operation of a system to a service operation of an external web service of an external system. For each mapping, mappings component 420 displays a task operation field, where a user can enter a task operation. Mappings component 420 also displays, for each mapping, an outbound service operation field, where a user can enter an outbound service operation of an external web service, and an inbound service operation field, where a user can enter an inbound service operation of the external web service. In one embodiment, mappings component 420 can display a drop-down list of one or more outbound service operations, and a drop-down list of one or more inbound service operations, where each drop-down list is dynamically generated based on parsing the service definition of the external web service provided by the user. In this embodiment, the user can select an outbound service operation from the drop-down list of one or more outbound service operations, and can select an inbound service operation from the drop-down list of one or more inbound service operations. Mappings component 420 further displays, for each mapping, an outbound transformation file field, where a user can enter an identifier of an outbound transformation file, and an inbound transformation file field, where a user can enter an identifier of an inbound transformation file.

According to the illustrated embodiment, user interface 400 also displays save button 430. By "clicking" on save button 430, a user causes the system to save the entered information and to create a composite application definition based on the entered information. User interface also displays composite application button 440, which, when "clicked," displays a drop-down list of actions, including "Build Connector," "Deploy Connector," and "Download Connector" (where the "Connector" reference is a reference to a composite application). By selecting the action "Build Connector," and "clicking" on composite application button 440, the user causes the system to dynamically generate a composite application based on the composite application definition. By selecting the action "Deploy Connector," and "clicking" on composite application button 440, the user causes the system to deploy a dynamically generated composite application. In certain embodiments, the system deploys the dynamically generated composite application in a production environment. By selecting the action "Download Connector," and "clicking" on composite application button 440, the user causes the system to download the dynamically generated composite application. In certain embodiments, the system downloads the dynamically generated composite application in a non-production environment, where the dynamically generated composite application can be tested.

Figure 5:
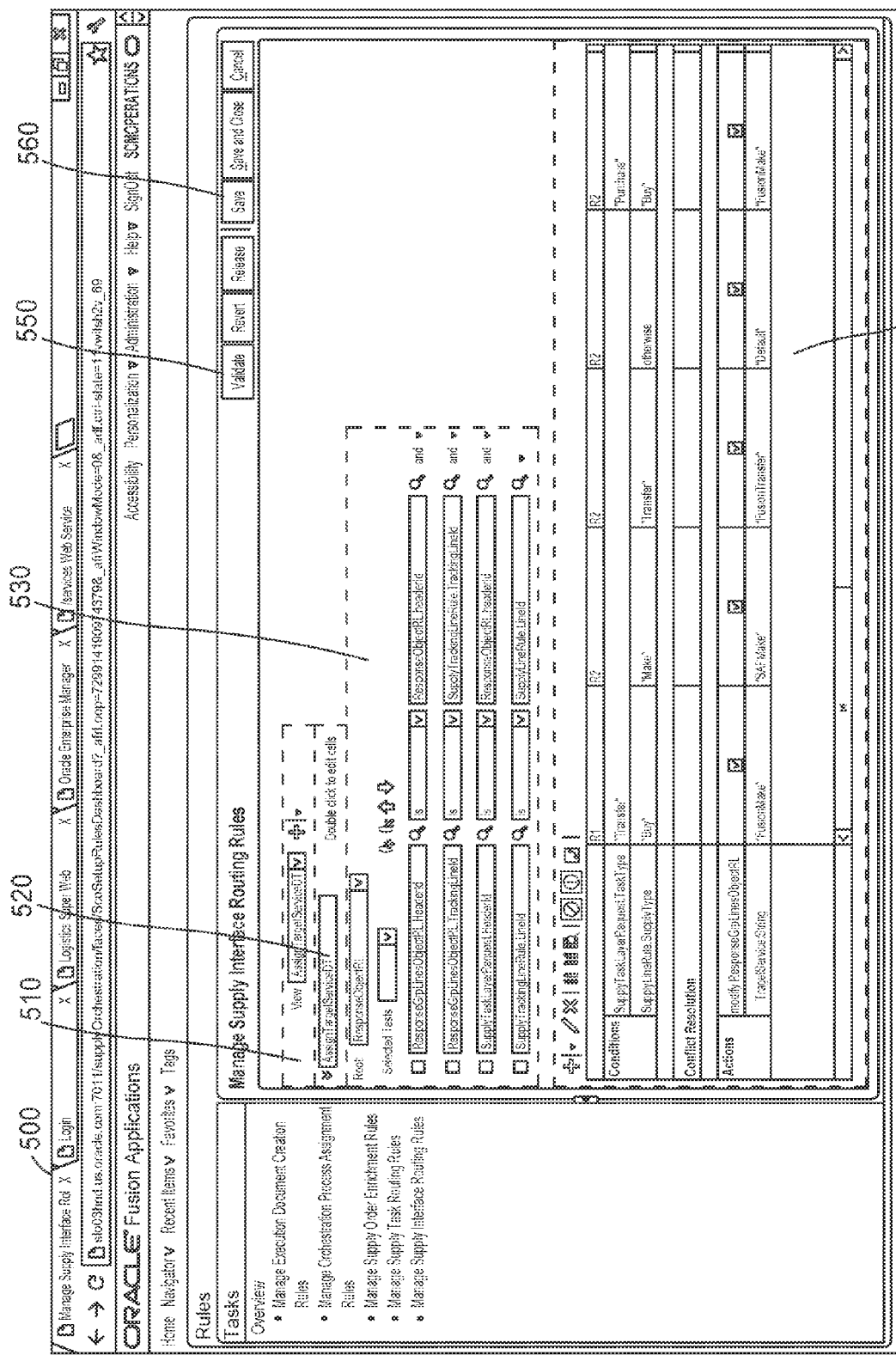
FIG. 5 illustrates an example user interface for creating a business rule that is used to select an external web service, according to an embodiment of the invention.

FIG. 5 illustrates an example user interface 500 for creating a business rule that is used to select an external web service, according to an embodiment of the invention. User interface 500 displays business rule component 510, where a user can select an existing business rule to edit, or create a new business rule. User interface 500 further displays business rule name component 520, where a user can enter an identifier of the business rule. User interface 500 further displays business rule root component 530, where a user can enter an object that the business rule is applied to. Such an object can include an object located on a task request that is received by the system, or the task request itself. User interface 500 further displays business rule body component 540, where a user can enter one or more conditions for the business rule and one or more actions for the business rule. A condition is business logic that, when satisfied or evaluated to a true condition, causes an action to be performed. A user can create a new condition or select from a drop-down list of pre-existing conditions. A user can further enter one or more values for the new condition (or selected pre-existing condition). An action is an execution of an operation, such as the execution of a dynamically generated composite application. A user can create a new action or select from a drop-down list of pre-existing actions. A user can further enter one or more values for the new action (or selected pre-existing action). User interface 500 further displays validate button 550. By "clicking" on validate button 550, the user causes the system to validate the business rule and determine whether the business rule contains any syntax errors. User interface 500 further displays save button 560. By "clicking" on save button 560, the user causes the system to save the business rule.

Figure 6:
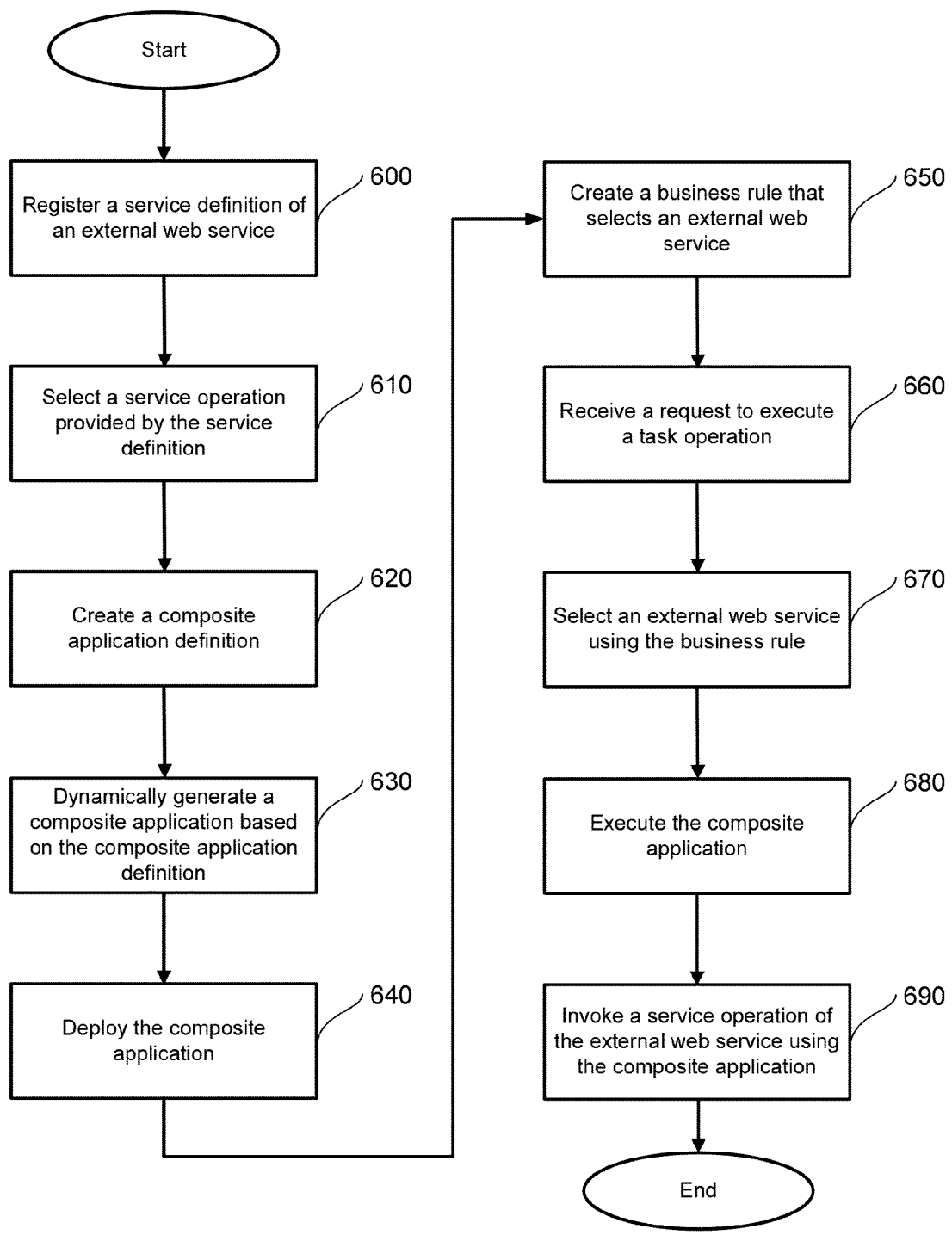
FIG. 6 illustrates a flow diagram of the functionality of a composite application generation module, according to an embodiment of the invention.

FIG. 6 illustrates a flow diagram of the functionality of a composite application generation module (such as composite application generation module 16 of FIG. 1), according to an embodiment of the invention. In one embodiment, the functionality of the flow diagram of FIG. 6 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 600. At 600, a service definition of an external web service is registered. A service definition describes an external web service of an external system. In certain embodiments, the service definition can be described using a web service description language. In some of these embodiments, the service definition can be described using a URL, where the URL describes the location of the service definition that is hosted by the external system. The flow proceeds to 610.

At 610, a service operation that is provided by the service definition is selected. A service operation is a logical operation that the external web service can perform. In certain embodiments, the service operation is selected from a plurality of service operations provided by the service definition. The flow proceeds to 620.

At 620, a composite application definition is created. The composite application definition includes external web service information, and thus, the creating of the composite application definition can include creating external web service information. External web service information is information regarding the external web service that allows a composite application to connect to the external web service. In certain embodiments, external web service information can include a plurality of security credentials, where the security credentials can include a keystore alias and a user credential key. In certain embodiments, the external web service information can include a maximum payload size of a message. Thus, the creating the composite application definition can further include the creating of the plurality of security credentials and the creating of the maximum payload size.

The composite application definition further includes one or more mappings, and thus, the creating of the composite application definition can include creating one or more mappings. A mapping is a mapping of a task operation to a service operation. The service operation can be the service operation selected at 610. In certain embodiments, a mapping can be a mapping of the task operation to an outbound service operation of the external web service. In these embodiments, a mapping can, alternatively, be a mapping of the task operation to an inbound service operation of the external web service. Thus, the creating the composite application definition can further include mapping the task operation to the outbound service operation of the external web service, and mapping the task operation to the inbound service operation of the external web service. In certain embodiments, a mapping can include a definition of an outbound transformation file that transforms a message from an internal format to an external format of the external web service. In these embodiments, a mapping can, alternatively, include a definition of an inbound transformation file that transforms a message from the external format of the external web service to the internal format. Thus, the creating the composite application definition can further include defining an outbound transformation file that transforms the message from the internal format to the external format of the external web service, and defining an inbound transformation file that transforms the message from the external format of the external web service to the internal format. The flow proceeds to 630.

At 630, a composite application is dynamically generated based on the composite application definition. A composite application is a software application that includes computer code. A composite application can include a mediator component, where the mediator component is a component that can route data, such as messages, from service providers to external systems, and vice-versa. Thus, a composite application can act as a service connector between an internal service of a system and an external web service of an external system. The flow then proceeds to 640.

At 640, the composite application is deployed. In certain embodiments, the composite application can be deployed in a production environment. The flow then proceeds to 650.

At 650, a business rule is created, where the business rule includes business logic that selects an external web service. A business rule is a rule that controls operation of a composite application based on business logic, such as one or more conditions and one or more actions, and run-time data, such as a task request. The business logic of the business rule can select an external web service from a plurality of external web services. Thus, the application of the business rule to run-time data, such as a task request, can determine, at least in part, which external web service is to be invoked, and thus, which composite application is to be executed, so the corresponding external web service is invoked. The flow proceeds to 660.

At 660, a request to execute a task operation is received. According to the embodiment, an external web service hosted by the external system can execute the task operation. The flow proceeds to 670.

At 670, an external web service is selected to execute the task operation. According to the embodiment, an external web service is selected by applying the business rule to the request to execute the task operation. By selecting an external web service, a composite application is also selected. The flow proceeds to 680.

At 680, the selected composite application is executed. The execution of the selected composite application invokes the selected external web service, as is further described with respect to 690. The execution of the selected composite application further includes transforming a request message from an internal format to an external format of the external web service based on a mapping of the composite application definition. The flow proceeds to 690.

At 690, a service operation of the external web service is invoked using the composite application. The service operation of the invoked external web service performs specified functionality based on the transformed request message. Further, in certain embodiments, a service operation of the invoked external web service generates a response message. The response message is received from the invoked external web service. In these embodiments, the composite application that invoked the external web service subsequently transforms the response message from an external format of the external web service to an internal format based on a mapping of the composite application definition. The flow then ends.

Thus, according to an embodiment, one or more composite application definitions can be declaratively defined, where a composite application can be dynamically generated based on a composite application definition, and where an external web service can be invoked using the dynamically generated composite application. This can minimize the coding of service integration (such as invoking execution services), and can provide a "plug-and-play" infrastructure to connect to external web services. A business analyst can define business rules, and set up services by creating mappings of task operations to service operations through a provided user interface, and no software development or technical skills are necessary. This can reduce implementation costs and enables an adoption of SOA-based connectivity by business analysts, based on reduced reliance on information technology-based coding efforts.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-readable medium having instructions stored thereon that, when executed by a processor, cause the processor to invoke an external web service using a composite application, the invoking comprising:
   creating a composite application definition, wherein the composite application definition comprises external web service information and a mapping of a task operation to a service operation of the external web service;
   dynamically generating the composite application based on the composite application definition, wherein the composite application comprises computer code; and
   deploying the composite application;
   wherein the creating the composite application definition further comprises:
   mapping the task operation to an outbound service operation of the external web service; and
   mapping the task operation to an inbound service operation of the external web service.

2. The computer-readable medium of claim 1, the invoking further comprising:
   creating a business rule, wherein the business rule comprises business logic that selects an external web service.

3. The computer-readable medium of claim 2, the invoking further comprising:
   receiving a request to execute the task operation;
   selecting the external web service to execute the task operation by applying the business rule to the request;
   executing the composite application; and
   invoking the service operation of the external web service using the composite application.

4. The computer-readable medium of claim 1, the invoking further comprising registering a service definition of the external web service.

5. The computer-readable medium of claim 4, the invoking further comprising selecting the service operation from a plurality of service operations provided by the service definition.

6. The computer-readable medium of claim 4, wherein the service definition is described using a web service definition language.

7. The computer-readable medium of claim 1, wherein the creating the composite application definition further comprises:
defining an outbound transformation file that transforms a message from an internal format to an external format of the external web service; and
defining an inbound transformation file that transforms a message from the external format of the external web service to the internal format.

8. The computer-readable medium of claim 1, wherein the creating the composite application definition further comprises creating a plurality of security credentials, wherein the plurality of security credentials comprises a keystore alias and a user credential key.

9. The computer-readable medium of claim 1, wherein the creating the composite application definition further comprises creating a maximum payload size of a message.

10. The computer-readable medium of claim 1, wherein the deploying the composite application further comprises implementing a run-time instance of the composite application in a production environment, wherein the run-time instance of the composite application is used to invoke one or more external web services of an external system.

11. A computer-implemented method for invoking an external web service using a composite application, the computer-implemented method comprising:
creating a composite application definition, wherein the composite application definition comprises external web service information and a mapping of a task operation to a service operation of the external web service;
dynamically generating the composite application based on the composite application definition, wherein the composite application comprises computer code; and
deploying the composite application;
wherein the creating the composite application definition further comprises:
mapping the task operation to an outbound service operation of the external web service; and
mapping the task operation to an inbound service operation of the external web service.

12. The computer-implemented method of claim 11, the computer-implemented method further comprising:
creating a business rule, wherein the business rule comprises business logic that selects an external web service.

13. The computer-implemented method of claim 11, the computer-implemented method further comprising:
receiving a request to execute the task operation;
selecting the external web service to execute the task operation by applying the business rule to the request;
executing the composite application; and
invoking the service operation of the external web service using the composite application.

14. The computer-implemented method of claim 11, wherein the creating the composite application definition further comprises:
defining an outbound transformation file that transforms a message from an internal format to an external format of the external web service; and
defining an inbound transformation file that transforms a message from the external format of the external web service to the internal format.

15. A composite application generation system, comprising:
a processor;
a memory configured to store one or more instructions;
a composite application definition creation module configured to create a composite application definition, wherein the composite application definition comprises external web service information and a mapping of a task operation to a service operation of the external web service;
an outbound mapping module configured to map the task operation to an outbound service operation of the external web service; and
an inbound mapping module configured to map the task operation to an inbound service operation of the external web service;
a dynamic generation module configured to dynamically generate the composite application based on the composite application definition, wherein the composite application comprises computer code; and
a deployment module configured to deploy the composite application.

16. The composite application generation system of claim 15, further comprising:
a business rule creation module configured to create a business rule, wherein the business rule comprises business logic that selects an external web service.

17. The composite application generation system of claim 15, further comprising:
a receiving module configured to receive a request to execute the task operation;
a selection module configured to select the external web service to execute the task operation by applying the business rule to the request;
an execution module configured to execute the composite application; and
an invocation module configured to invoke the service operation of the external web service using the composite application.

18. The composite application generation system of claim 15, further comprising:
an outbound definition module configured to define an outbound transformation file that transforms a message from an internal format to an external format of the external web service; and
an inbound definition module configured to define an inbound transformation file that transforms a message from the external format of the external web service to the internal format.

* * * * *